US005754649A

United States Patent [19]
Ryan et al.

[11] Patent Number: 5,754,649
[45] Date of Patent: May 19, 1998

[54] VIDEO MEDIA SECURITY AND TRACKING SYSTEM

[75] Inventors: John O. Ryan, Cupertino; E. Fraser Morrison, Redwood City; Gregory C. Copeland, San Jose, all of Calif.

[73] Assignee: Macrovision Corp., Sunnyvale, Calif.

[21] Appl. No.: 880,203

[22] Filed: Jun. 23, 1997

Related U.S. Application Data

[63] Continuation of Ser. No. 475,592, Jun. 6, 1995, abandoned, which is a continuation of Ser. No. 440,194, May 12, 1995, abandoned.

[51] Int. Cl.[6] .................. H04L 9/00; H04K 1/00; G11B 15/04; G11B 19/04; G07D 7/00
[52] U.S. Cl. .................. 380/4; 380/21; 380/23; 380/25; 360/60; 340/825.31; 340/825.34
[58] Field of Search .................. 380/4, 3, 5, 21, 380/23, 25; 360/33.1, 60, 132–135; 369/48, 58, 59; 340/825.31, 825.34

[56] References Cited

U.S. PATENT DOCUMENTS

| | | | |
|---|---|---|---|
| 4,453,074 | 6/1984 | Weinstein | 235/380 |
| 4,866,769 | 9/1989 | Karp | 380/4 |
| 4,991,208 | 2/1991 | Walker et al. | 380/20 |
| 5,111,504 | 5/1992 | Esserman et al. | 380/21 |
| 5,267,311 | 11/1993 | Bakhoum | 380/4 |
| 5,379,433 | 1/1995 | Yamagishi | 395/725 |
| 5,392,351 | 2/1995 | Hasebe et al. | 380/4 |
| 5,400,319 | 3/1995 | Fite et al. | 369/275.5 |
| 5,400,403 | 3/1995 | Fahn et al. | 380/21 |
| 5,426,701 | 6/1995 | Herman et al. | 380/52 |
| 5,450,489 | 9/1995 | Ostrover et al. | 380/3 |
| 5,457,746 | 10/1995 | Dolphin | 380/4 |
| 5,461,675 | 10/1995 | Diehl et al. | 380/3 |
| 5,509,073 | 4/1996 | Monnin | 380/20 |
| 5,537,473 | 7/1996 | Saward | 380/16 |
| 5,555,304 | 9/1996 | Hasebe et al. | 380/4 |
| 5,563,947 | 10/1996 | Kikinis | 380/4 |
| 5,596,639 | 1/1997 | Kikinis et al. | 380/4 |

FOREIGN PATENT DOCUMENTS

| | | | |
|---|---|---|---|
| A393955 | 10/1990 | European Pat. Off. | |
| 89/10615 | 11/1989 | WIPO | |
| PCT/US96/04027 | 3/1996 | WIPO | G06F 1/00 |

Primary Examiner—Thomas H. Tarcza
Assistant Examiner—Hrayr A. Sayadian
Attorney, Agent, or Firm—Gerow D. Brill

[57] ABSTRACT

A video disc designed for providing security and tracking data in the rental video media market. Those new formats for video players and media allow for inclusion of security features which both allow tracking of rental of such media and prevent unauthorized rental thereof. Each player includes a decision circuit which plays a particular optical disc only if a player identification number recorded on a special separate magnetic track on the optical disk is the same as the player identification stored in the player, and if a movie identification number optically read from the disc matches a movie identification number recorded on the special separate magnetic track. A corresponding apparatus is provided at the video rental store which, at the time of rental, records on a magnetic portion of the media in encrypted form the movie identification number and the number of the particular disc player for which that rental is intended. The authorization encryption uses the private key of a public key system, the public key and the modulus being pre-recorded on the optical portion of the disc.

2 Claims, 3 Drawing Sheets

VIDEO MEDIA SECURITY AND TRACKING SYSTEM

CROSS-REFERENCE TO RELATED APPLICATION

This application is a continuation of application Ser. No. 475592, filed Jun. 6, 1995, now abandoned, which is a continuation of commonly invented application Ser. No. 08/440,194, filed May 12, 1995, entitled *Video Media Security and Tracking System.*

BACKGROUND OF THE INVENTION

1. Field of the Invention

This invention relates to security systems for video media and more particularly to a system for allowing an owner of copyrighted video material to control, on a per use basis, viewing of that material provided on a prerecorded medium such as a video disc or video tape cassette.

2. Description of the Prior Art

As is well known, typically video tape cassettes or video discs containing prerecorded material such as movies are commercialized as follows. The owner of the copyrighted material on the video cassette or disc, i.e. the movie studio ("rights owner"), arranges for duplication of the movie onto a large number of video tape cassettes or discs. The video tape cassettes and discs are then sold by the movie studio to owners of video rental stores who then rent each video tape cassette or disc out as many times as they can, depending on demand. However, the owner of the video rental store only pays for each video tape cassette or disc once, because he has purchased it outright from the movie studio. Thus the bulk of the profits due to rental of such material accrue to the video rental store owner rather than to the movie studio. This is because the so-called "first sale doctrine" prevents the seller (the movie studio) of the video tape cassettes or discs from exercising any degree of control over the downstream commercialization (e.g., rental) of its products. This is the case even though the video material is copyrighted.

It has been frustrating to the rights owners (movie studios, etc.) that they are not able to better control and/or profit from the rental market for their movies and other program material. Various methods have been proposed to allow the rights owners to overcome the first sale doctrine and acquire some degree of control over the rental of, for instance, VHS video tape cassettes.

One proposed method uses a "non-rewindable" cassette. Once played by the consumer (renter), the cassette must be returned to the rental store for rewinding. The rewinding machine is such that it automatically records each rewinding transaction and the movie studio (or its agent) can then periodically check the rewinding machine, either on the spot or by telecommunications, for a transaction-by-transaction record. This of course requires some business arrangement between the video store owner and the movie studio to pay for the video cassette on a per use basis. Such arrangements are contractual matters outside of the purview of this patent disclosure.

The non-rewindable cassette has the obvious disadvantage that each renter may watch each movie only once per rental. This is frustrating to the renter who may wish to watch the movie more than once. There is also obviously a temptation on the part of the video store owner to tamper with the rewinding machine and hence end up paying fewer for rentals of the cassette than he is obligated to pay for.

A second proposal now being tested involves installing a special integrated circuit in each individual video tape cassette. This circuit turns itself on a predetermined time after being armed and radiates an interfering radio signal to the VCR electronics, thus effectively prohibiting further playing of that video tape cassette until it is returned to the rental store for reprogramming of the circuit. Again, the reprogramming machine automatically records the reprogramming transaction. So far this proposal has limited support due to the cost of the circuit in the video tape cassette, possible consumer inconvenience if the circuit malfunctions, and the ease with which it could be cheated by the video store operator or so-called "hackers". (The term "hacker" herein refers to anyone attempting to defeat system security by technical means.) The same deficiencies apply to the non-rewindable cassette approach. The circuit inside the video cassette also requires provision of a battery to power such a circuit, with the attendant practical complications.

Other proposals involve mechanical or electronic counters installed in each video tape cassette to count the number of plays. Again, this is problematic if a particular renter might want to play the video tape cassette more than once, and also is easily overcome by tampering.

It is to be understood that the video store owners interests in this regard are to a large extent the same as those of the rights owners. If a reliable system could be found to share rental revenues between the rights owners and the video store owners, then the rights owners would provide many more copies of each movie for rental to each store, hence increasing profits for both parties.

None of the above security systems are feasible for use with, for instance, video discs, which are soon expected to become very popular in new digital formats. Additionally, it is to be understood that the deficiencies of the above systems are a consequence of constraints imposed by the requirement that any such security system must be compatible with the large installed base of VCRs. Thus the proposed solutions to this problem are essentially unsatisfactory and none have been widely implemented.

SUMMARY

The present inventors have recognized that it is advantageous if a security system, instead of being forced to operate with the constraints of the present installed base of VCRs, instead uses a player compatible with new recording media specification(s) and includes a dedicated low cost rental control subsystem. Such a security system is especially suitable in anticipation of the introduction of new formats for video media such as the Digital Video Disc (DVD) and the Digital Video Cassette (DVC).

Implementation of the present security system requires that a significant proportion of the rights owners agree on the desirability of being able to better control commercial use of their copyrighted materials for the new formats, and as a consequence that the manufacturers of the players would be receptive to making compatible players in the expectation of increased support for their formats.

In accordance with the present invention, the present inventors have identified several important security system attributes. One is functionality, that the system track and report each rental transaction both by program (movie) title and length of time (days or hours) rented out. Further, the system should be capable of segregating transactions by, for instance, movie studio, and downloading this information on a periodic basis by e.g. the telephone lines to a transaction service center or to particular copyright owners.

The next attribute is a high level of system security; the present system is believed to be impossible (or prohibitively expensive on a practical basis) for unscrupulous video rental store owners (or hackers in collusion with video rental store owners) to cheat on or to compromise. Thus in accordance with the invention the rights owners can be confident that they are properly recompensed for rental activity. In the event of any security breach, in accordance with the invention it is possible quickly and inexpensively to recover from the breach and minimize resulting losses. Also, in accordance with the invention, there is tracking system security, in that particular rights owners are assured that transaction data relating to their particular video material (movie titles) is not accessible by others.

Another attribute is that the present system is operationally simple, providing minimum operational burden to the employees of the video rental store. Similarly, the users (renters) enjoy operational simplicity so that the system is essentially transparent to the renter of the video material and does not interfere with his enjoyment of the rented material.

As a last attribute, the present system adds minimal cost both to the players and the media. In addition, the cost of the in-store transaction monitoring and reporting equipment is believed to be quickly recoverable.

One embodiment in accordance with the present invention is directed to the digital video disc format medium. However, it is to be appreciated that the present invention is also applicable to systems using analog or digital video cassette tapes or analog video discs or other media using magnetic, optical or magneto-optical or other types of recording. This system is also applicable to other than video material such as audio material. (However, generally audio media are sold outright and not rented.)

Moreover, while one embodiment disclosed herein involves digital video disc media, it is to be understood that the invention is not particular to digital material but is also applicable to analog recordings.

In accordance with the invention there is a "TTRD" (transaction tracking and reporting device) which is an apparatus for use in a video store, and a method of using the TTRD to record, on a separate authorization card, in encrypted form of a program (movie) identification for the material prerecorded on the disc or tape and also in encrypted form the identification of a particular player. The authorization card is a reusable memory card having a capacity of about 100 bytes and being semiconductor, magnetic, or other suitable memory technology.

In addition, in accordance with the invention there is provided a modified player (a DVD player or video cassette tape player) which in addition to the conventional circuitry includes dedicated rental control circuitry and/or software for reading, from the prerecorded material on the medium, rent/sell authorization data, a public decryption key, and the program identification. Also provided in the player is a slot to accept the authorization card for reading the authorization card and connecting via a data decoder and error correction circuitry to a decryptor. The decryptor also receives the public decryption key which was optically recorded on the disc, and thereby decrypts from the data on the authorization card the program identification and the player identification. A special decision circuit in each player compares the player identification from the authorization card to that stored in a read only memory in the player, and also compares the program ID from the decryptor to the program ID provided from the prerecorded material. Only if both the two player identifications are authenticated (match) and the two program identifications are authenticated (match), is the player enabled to play the prerecorded material.

Of course if authorization data indicating that this is a sell-through (non-rental) disc is present on the disc, i.e. there is a authorization indication to play, then even if no program or player identification matches are made, the player is enabled to play the prerecorded program material.

Also therefore in accordance with the invention is a method of operating the player to authorize its operation to play the prerecorded material.

In an alternative embodiment, the authorization card is not used and instead a writable (e.g. magnetic) memory is located on the disc itself, by providing a narrow circular magnetic track near the center of the disc, to be read by a special magnetic head in each DVD player.

The last element is the prerecorded media. In the case of the DVD disc, this is a video disc including (in the alternative embodiment) the magnetic track located at a convenient location, such as near the disc center. The magnetic track on the disc as it comes from the factory and is shipped to the video rental store is typically blank but has space sufficient to record on it the encrypted program identification and encrypted player identification.

It is to be understood that hereinafter when reference is made to the authorization card, in the alternative embodiment this refers to the magnetic track on the disc or an equivalent for a video tape cassette.

In the case of a video tape cassette suitable for use in accordance with the present invention, recorded on the video tape at a convenient location(s) is the data decryption key and the program identification. Recorded at another location only in the alternative embodiment (for convenience of reading by the TTRD without rewinding of the video tape itself) is a second separate magnetic track which is sufficient size to include space for recordation of the encrypted program identification and encrypted player identification. The location of the second magnetic track may be for instance on the outside of the cassette housing. Thus when the video tape cassette is inserted into the TTRD (or the VCR), the insertion and corresponding movement of the cassette into the TTRD (or VCR) passes this track past a fixed magnetic head and hence allows easy reading thereof. In another version of the alternative embodiment, the second magnetic track is located on the end of one of the video tape cassette spindles, and hence the spinning of these spindles moves the magnetic track past a suitably located small magnetic head. In either case, there is no need to search for the encrypted data on the video tape itself.

DETAILED DESCRIPTION OF THE PREFERRED EMBODIMENTS

Figure 1:
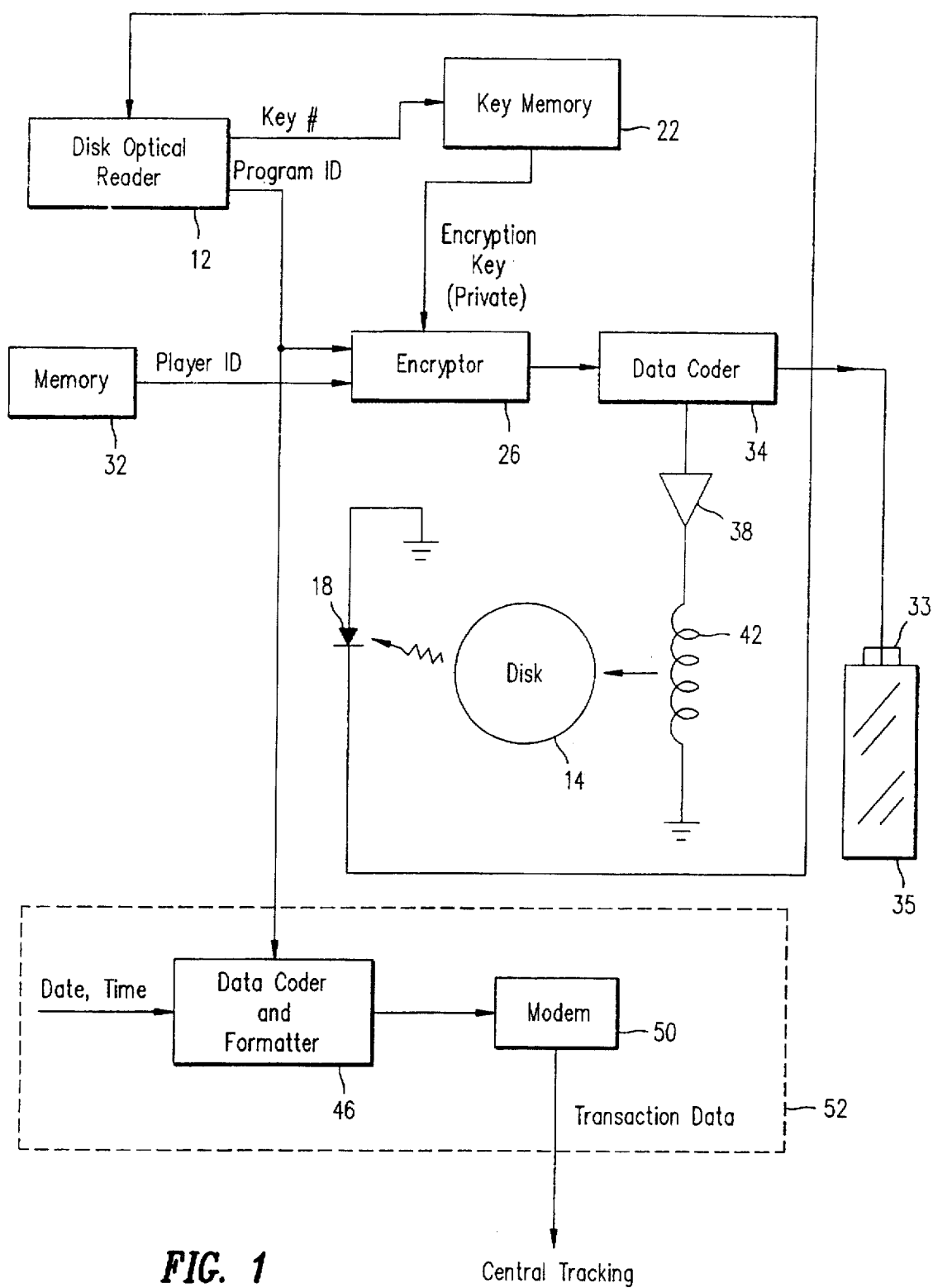
FIG. 1 shows a transaction tracking and recording device in accordance with the present invention.

In a Digital Video Disc (DVD) embodiment, each DVD player, which is otherwise of a conventional type recently announced, for instance, by Toshiba or Sony or any other type, includes embedded in an internal memory a stored identification. This identification (e.g., a number) need not necessarily be the same as the player serial number. This identification is e.g., at least 6 or 8 decimal digits for best security. The player identification may have significantly fewer digits than the player serial number, for instance, having as little as two decimal digits at a penalty of reduced security. Thus the player identification need not be unique to each digital video player, but is a number large enough so it is not likely to be easily duplicated amongst the number of individual DVD players which a hacker may encounter.

Each corresponding digital video disc intended for the rental market includes, in addition to the normal optical prerecorded track in the alternative embodiment only, an additional narrow circular magnetic recording track located for instance near the center of the disc (this location is illustrative and not limiting). This track need hold approximately only 100 bytes of data. The magnetic track is read by a magnetic read head provided in each DVD player in accordance with the present invention. It is to be understood that the industry proposed DVD players do not include the slot to accept the authorization card (or in the alternative embodiment the magnetic head) and associated circuitry, and the addition of these elements is a required modification to DVD players in order to practice the present invention.

Each DVD disc intended for rental also will contain a number of extra bytes of information optically recorded during the conventional mastering of the disc, as part of the disc initializing information. In conventional CDs for instance, and also in the proposed DVD discs, there is a scan region which is read by the player in the initialization cycle of the disc. The initialization information conventionally includes data such as running time, number of tracks, and perhaps location of particular portions of the recorded material. In accordance with the invention, each rental disc will include, in addition to the conventionally provided information in the initialization region, a number corresponding to, for instance, the particular title of the movie recorded in the optical portion of the disc (a movie or program identification) and additionally an instruction telling the player to read the magnetic track of that particular disc to obtain authorization to play the disc. Discs intended for the sell-through market, i.e. to be sold at retail to consumers, will not include such an instruction to seek authorization. To put this another way, discs intended for the sell-through market will include an instruction which does not require the player to read the authorization card for authorization to play the disc, but will authorize the player to play the disc without consulting the authorization card.

The information recorded on the authorization card includes the movie identification(s) and the player identification of a particular player or players authorized to play that disc. This information on the authorization card is encrypted and recorded at the time of the rental transaction by the transaction tracking and reporting device (TTRD), provided to each rental store in accordance with the present invention. "TTRD" is nomenclature used herein for convenience to refer to a device as described in detail below. It is to be understood that such a device need not necessarily be a stand-alone device but may for instance be incorporated into other transaction reporting equipment already present in video rental stores, with appropriate features as described below.

A conventional electronic clock in each TTRD records, for each rental transaction, the time and date of authorization and later records when the particular disc was returned to the rental store after the rental was completed.

Each DVD player, which is otherwise conventional, also includes a decision circuit which allows that particular player to play a particular disc only if its player identification matches the authorized player identification read from the authorization card, and also if the movie identification optically read from the disc matches the movie identification read from the authorization card).

When a rental customer first becomes a customer at a particular rental outlet or rental chain, the customer provides the rental store employee with the player identification of the customer's own DVD player. This identification, along with e.g. the customer's name and/or telephone number, is entered into the TTRD via e.g. a standard keyboard interface or by a bar code reader. Thus for instance a particular customer can become a member, as now, at any number of rental stores and thereafter need only provide conventional information, i.e. name or telephone number or rental identification card, to rent a disc.

When a particular disc is rented, it is inserted by the rental store employee into the TTRD which then optically reads from the disc the movie identification from the disc's initialization region and records it, along with the customer's player identification, on the authorization card. This operation is automatic and takes only a few seconds.

The authorization card is supplied by the rental store at the time of each rental; one card may include information for several rented discs. The cards will cost about $1 each to manufacture, and are reusable. The authorization card approach is less convenient to the rental store and renter than is the magnetic track on the disc, since an extra physical item is involved. The card may be sized to fit inside the disc "jewel case" to minimize risk of loss. However, the authorization card approach is less expensive in terms of cost of manufacturing the players. The security and functionality of the system are independent of the authorization media employed.

After the customer has finished using the disc and returns it to the rental store, the rental store employee briefly inserts the disc in the TTRD which reads both the magnetic and optical data and records in the TTRD memory the data and time of the return. The TTRD then has a complete record of the transaction.

This system provides the above described advantages. In terms of functionality, for transaction tracking information the electronic clock in the TTRD notes each disc's time and date of authorization and when it was returned to the rental store. Combined with the movie title and renter's player identification if desired, this is sufficient information to track rental activity. It is to be noted however that in certain embodiments of the invention the rental tracking features are not necessary and only the below-described security features are included. Thus in certain applications where the rights owner may for instance not require transaction information but merely wants security, the functionality of transaction tracking and the accompanying structures may be dispensed with.

One added advantage of the present system is that it prohibits a particular renter from lending his rented disc (or tape) to a friend or relative, since only the particular renter's DVD player has been authorized to play any particular disc. This feature may advantageously generate extra rental transactions. If a particular customer owns more than one DVD player, the system accommodates this by allowing the recordation of more than one player identification on the authorization card (or on the disc magnetic track). The system prohibiting lending to a friend may then be circumvented by a customer listing his friend's player as his own. (This would of course be found out if the friend then were to rent a disc on his own from the same rental store or rental store chain.)

A major advantage in accordance with the invention is that system security is maintained even though a hacker acquires complete knowledge of the security principles used and is also fully capable of probing the entire operational details of the authorization circuits in a particular DVD player. That is to say, the DVD player itself holds no secrets and yet the system is still secure. The security system has two aspects. The first is preventing illicit transactions. The second is restricting access to the transaction data in accordance with the transaction reporting system. Of these, the first is probably more important.

In order to prevent illicit transactions, that is to prevent a hacker from designing a "black box" device to illicitly record authorization data on an authorization card, this data (the player and movie identification) is concatenated and encrypted and written on the authorization card (or on each disc) by the TTRD, using a public key encryption system. Such systems are well known. The following is a brief review of pertinent encryption methods.

The most common form of data encryption and best known to the layman, is called private key or symmetrical encryption and is the method historically used for encryption. Such methods use the same key to encrypt and to decrypt data. To guard against trial and error attempts at guessing the encryption key, the key is usually a large number, i.e. an 18 decimal digit number. The DES (data encryption system) algorithm is an example of a private key system in which data, arranged in 64 bit blocks, are encrypted using a 56 bit key. (Fifty-six bits are equivalent to approximately 17 decimal digits.)

In private key encryption systems, as is well known, the chosen key must be kept secret from hackers (or any one with an adverse interest) to ensure security. However at the same time the key must be provided to a potentially large group of legitimate users. In a typical (military) context, there is a relatively small number of legitimate users and hence such systems have historically been used somewhat successfully. However, for the present purpose each DVD player must include the decryption key in order to read the authorization medium. Thus hackers, who can easily buy a DVD player, would have at least in some form access to the key, hence substantially reducing system security. That is to say, it is unrealistic to believe that the decryption key used in such a player would be protected against the determined effort by a hacker to read it, given the low cost and ubiquity of the players. Therefore it is believed that a private key encryption system is more likely to be penetrated, but however may be used in accordance with the present invention where the above-described drawbacks may be of less importance.

The other type of data encryption uses a public key and is also referred to as asymmetrical encryption. Thus there are two different keys in such a system. The first is the private key, known only to authorized users as in the above described private key system; the second key is the public key which may be widely known without risk of system penetration, i.e. hacking. One key (either key) is used for data encryption and the other key is used for decryption. An essential feature of all public key systems is that knowledge of the decryption key does not allow the hacker to encrypt a message and vice-versa.

The most secure public key system commercially available is from a company called RSA Data of Redwood City, Calif. The security of this system is predicated on the difficulty of factoring very large numbers, containing upwards of one hundred decimal digits. The fastest known factoring algorithm running on the fastest computers typically takes decades to factor such numbers. The larger the key, the more difficult factoring becomes. In practice, the size of the key is chosen to reduce the cost effectiveness of a factoring effort to unacceptable levels for a would-be hacker, throughout the expected life of the product and with due allowances for anticipated increases in computing power.

In accordance with one embodiment of the present invention, the private key of the public key system is used for encryption. Thus this key is securely stored in each TTRD in such a manner that any attempt to extract the private key from the TTRD causes erasure of the key. This is relatively easy to accomplish since there are limited number of TTRD devices (typically one per rental store) each of which is electronically polled from time to time for ordinary transaction purposes. Hence any breach of security is likely to be easily detected. The technical means for protecting such keys embedded in an integrated circuit in the TTRD are well known. One simple method is that an attempt to open the TTRD housing results in immediately erasure of the private key. Similarly, since the key is likely to be embedded in a volatile memory, any attempt to electrically contact the leads of the memory results in erasure of its contents. Other types of security interlocks are well known, and multiple interlocks may be provided. Additionally of course, any successful attempt to obtain a data from a particular TTRD would point to the custodian of that TTRD as a likely conspirator. The mere existence of such knowledge would, it is believed, reduce penetration attempts.

The corresponding public key needed for decryption of the DVD player is optically recorded on the disc along with the aforementioned movie identification and the authorization (rent/sell) instruction, as part of the ordinary optically recorded content of the disc. When the disc is to be played, this key is read by the DVD player and is used to decrypt the data on the authorization card, in order to enable playing.

The public key is recorded optically on each disc rather than stored in each DVD player in order to permit quicker recovery from a security breach. In the unlikely event that the current private key became known, thereby threatening system security, a new pair of keys could quickly be generated. The new private key would be downloaded (i.e. via telecommunications) to each TTRD and the corresponding new public key would then be used on all new discs to be manufactured from that day on. Thus revenue losses would be restricted to video rental stores which obtained an illicit authorization device from a hacker, which now could be used only to authorize playing of movies released before the date of the key change. Furthermore, any abnormal reduction in rental transaction reporting of particular movies released before the security breach occurred, from a particular rental store, would indicate that store was a possible illicit operator.

In order to allow TTRDs to continue to authorize older movies after a new pair of keys is distributed, each TTRD would store the full history of keys used, organized by serial number, and automatically encrypt the data to be recorded on the authorization card with the appropriate private key. This is accomplished by appending the key serial number to the public key recorded on the disc's optical track. The TTRD reads the serial number first and then selects the appropriate private key to perform the encryption from the set of private keys stored in the TTRD in its memory.

The movie ID is both recorded optically on the disc and encrypted (along with the authorized player ID) on the authorization card for two reasons. The first reason is to permit TTRDs to track which particular movies are being rented. The second reason applies to system security; if data recorded on the authorization card were merely an encrypted instruction that would authorize any disc to be played by a DVD player having a particular identification, then that encrypted data stream could be obtained by a hacker and reused later. This would be done using a hacker's device to record the data stream on the authorization card. This would illicitly authorize playing of other movies by the same DVD player (that is, for the same customer).

A vital feature of a public key encryption system is that it is not possible to deduce what the encrypted data would be for a block of data which differs by as little as one bit from a block of data whose encrypted value is already known. In other words, knowing the encrypted data for an instruction to allow e.g. movie number 566 to play on a player with player ID 1289, would not allow a hacker to deduce what encrypted data would correspond to an instruction to allow movie number 567 to play on the identical player. Thus the most a hacker could do would be to note the code sequence which authorizes playing a particular movie for a particular player and later reuse that same code sequence with the same customer desiring to rent the same movie at a later time. Thus at most such hacking would obtain for the unscrupulous rental store owner one additional rental without having to pay the rights owner for that one particular rental. The effort required to do this seems to vastly outweigh any likely financial gain and hence it would not be done.

In terms of restricting access to transaction data, the system also uses in one embodiment a public key encryption system (not the same one as above in terms of the keys themselves) to report transactions. Thus each rights owner (e.g. movie studio) is assigned a unique private key/public key pair. Each TTRD stores the public key of each studio. Transaction data relating to a particular studio is encrypted within the TTRD prior to storage and transmission of same, using that studio's public key. Only the studio (or its agent) is provided with the corresponding private key needed to decrypt the transaction data.

The rest of the system provides operational simplicity because at the time of rental, the video rental store employee must enter the renter's name or telephone number as is done conventionally using either a keyboard interface or a bar code scanner from an identification card including identification number, and then the employee additionally in accordance with the invention inserts the renter's authorization card and the particular rented disc in the TTRD. In the first embodiment using the authorization card, the TTRD includes a plug in socket for electrically connecting to the authorization card. In the second embodiment using a magnetic track on the disc, the TTRD includes a special recording head to record on the special magnetic track on the disc (or tape cassette).

The TTRD in either embodiment includes a port and loading mechanism such as those of a DVD player. The authorization card and the disc are ejected in a few seconds and the first part of the transaction is automatically recorded. When later on the renter returns the disc (or soon thereafter) the employee again inserts the disc in the TTRD and indicates the return transaction on its keyboard interface. The final part of the transaction, i.e. the time of disc return, is now recorded and the disc is again ejected and replaced on the store shelves. The authorization card is merely returned for later reuse. Transaction reporting to the rights owner or its agent is done automatically, for instance via modem and telephone lines, at a convenient time. Transaction reporting may also be done by other well known means. Thus the effort required of the video rental store employee is only slightly greater than that required in existing rental stores using point of sale terminals to store customer information and bar code readers to check out and check in video tape cassettes or discs.

Additionally, customer convenience is provided in accordance with the invention. Additional effort required by the customer is that when he first signs on (becomes a member) at a particular rental store or rental store chain, the customer provides the store employee with his player identification (or identifications if he owns several players). Each DVD player thus for convenience would be sold along with several cards printed with the player identification in type and e.g. bar code or a magnetic stripe. The player identification is also stamped on the rear panel of each DVD player along with the serial number. Thus the extra effort in providing one's player identification is a one-time effort accomplished when one first becomes a video rental store member.

It is believed that the cost of implementing the present system is low. The cost of including in the alternative embodiment a magnetic read head and the associated authorization circuitry in each player is estimated to be $1; the most of this cost is the magnetic read head and its associated amplifier. Thus the cost is significantly less for the authorization card embodiment. The remainder of the needed circuitry is typically in the integrated circuitry already included in the player at only very slight additional cost. It is to be noted that much of the circuitry may, of being actual logic circuitry, instead be software in the microprocessor which operates the DVD player.

It is estimated that for the alternative embodiment the cost of providing the circular magnetic track on mass produced discs is $0.01 to $0.05 per disc. This magnetic track would be narrow and need not be of high density, since the actual amount of data recorded on the track is small.

While the cost of each TTRD would be substantial, only one such device need be provided per video rental store and these devices could be mass produced due to the large number of video rental stores.

FIG. 1 shows in a block diagram one embodiment of the TTRD which is located in the video rental store. This device includes a conventional video disc optical reader 12 of the type conventionally found in disc players and in this case typically of the type used in a DVD player. It is to be understood that the references herein to DVD players are because it is anticipated that the present invention is most likely to be adapted in such a new video media standard. However, the present invention is compatible with other video disc and tape formats. (Of course, present video disc and tape players do not include the circuitry needed to implement the present invention.) It is to be understood that the disc optical reader 12 includes conventional mechanical elements (not shown for simplicity) for spinning the disc 14.

In the conventional operation of a DVD player, after insertion of the disc into the player, the player scans a region of the disc located near the center called the initialization region in order to obtain information about the contents of the disc recorded there which is typically presented on a display of the disc player. In accordance with the invention, this initialization region has recorded on it, in addition to the conventional information, the program (movie) identification, the rent/sale indication and the decryption key which includes conventionally the key serial number, the public key, and the key modulus. Typically, the program identification need not be in alphanumeric form but may be merely a code number i.e., a 6 or 8 decimal digit code. It might be as few as 4 decimal digits to uniquely identify for instance each movie released during a period of several years.

The disc optical reader 12 reads from the optically recorded portion of the disc 14 via conventional laser reading mechanism 18 two pieces of data; these are (1) the key serial number, the public decryption key, and modulus and (2) a program identification number. This data is located as described above in the initialization region of the disc which already contains formatting information pertaining to the disc contents.

The disc optical reader 12 extracts this data from the stream of data read from the disc by laser reading mechanism 18. The key serial number is then (in one embodiment) provided to a key memory 22 which stores, in a secure fashion as described above, a list of private encryption keys for a public encryption key system. Thus the key number is in effect an address which indicates which particular key stored in key memory 22 is the one to be used as the private encryption key. This private encryption key is then provided to an encryptor 26 of a type commercially available from e.g. RSA Data as described above. Typically, this encryptor is actually a set of software routines (a computer program) to be executed conventionally by a microprocessor. The data encrypted by encryptor 26 is the program identification provided from disc optical reader 12 concatenated (in a block of data) with a particular player identification. This player identification is provided as described above from a memory 30 which is part of the TTRD, or entered for instance by keyboard or bar code reader at the time of the transaction. The player identification is that of the particular player belonging to the rental customer.

The program identification in addition to being used for tracking also increases system security. That is, if there were no program identification, the only information recorded on the magnetic track of the disc would be the encrypted player number. Thus a hacker could breach the security of the system by reading the authorization card to obtain the code to authorize play, i.e. enable use of a particular player, by merely reading and recording the encrypted data pertaining to that player number. There is no need in this case for the hacker to decrypt this number but he merely needs to record the appropriate encrypted data on the magnetic track of the disc without using the TTRD, i.e. bypassing the TTRD, and thus cheating the rights owner by not recording the particular rental transaction. Thus by providing a piece of information which is unique to each rental transaction (a program identification number) and given the use of a public key system, it is made impossible for a hacker to determine what the encoded data would be for a different movie for the same player, due to the nature of public key encryption systems.

Thus it is to be understood that information other than the program identification could be used for this purpose. That is, when each particular optical disc is produced, instead of providing on the optical track a program (movie) code number, instead a random number is provided. Then the TTRD would read this random number, encrypt it and record the encrypted random number on the authorization medium. Thus the term "program identification" used herein does not refer necessarily to a number used universally for all discs carrying a particular movie, but instead to any number or information pertaining to a particular disc or video tape. Thus the program identification need not be unique to each movie; possibly a limited field with few as e.g., numbers 0 to 100 would be adequate to provide security, even though thus several movies might have identical program identifications. Thus for purposes of security alone, the program identification need not be a movie (title) identification. However, to maximize security, each movie should have a unique identification number.

Encryptor 26 then encrypts this data and provides it to a data coder 34 which formats and codes the data into a particular conventional modulation scheme as desired. Authorization card 35 is connected to data coder 34 by slot connector 33, to record the coded data on card 35.

In the alternative embodiment, also shown for simplicity in FIG. 1, the coded data is then provided to a conventional amplifier 38 which drives a magnetic recording head 42 of the type commercially available. Head 42 then records the data on the magnetic track provided on disc 14. As described above, typically this magnetic track is near the hub of the disc but this location is not limiting. It is to be understood that typically both embodiments would not be used in any one TTRD.

This being a rental type disc, prerecorded on the optical track is an instruction (perhaps only a single bit in a predetermined location) indicating that this is indeed a rental disc. In the absence of such instruction, this disc is understood by the player (as described below) to be a disc that has been sold to the user. If a "sell" disc is accidentally subject to the TTRD process as described above, this will have no effect on the use of the disc for reasons described below.

After the encrypted program identification and player identification are recorded on the card 35, card 35 and disc 14 are ejected from the TTRD and both given to the rental customer for his use.

Also a part of the TTRD of FIG. 1, but not needed for security reasons, is the tracking and reporting portion 52 including a data coder and formatter 46 which receive the program identification from the disc optical reader 12. Also provided via an electronic clock (not shown) is a date and time indication of the time of the rental transaction. These two items of data are conventionally coded and formatted into suitable form and provided to for instance a modem 50 which then transmits this transaction data to a central tracking computer, for instance for each movie studio, via telephone lines. It is to be understood that the tracking and recording portion 52 is not needed for security reasons but is provided for commercial reasons to allow each movie studio to determine the number of rentals of its films.

In this system the particular player number is purposely not provided to the data coder and formatter 46. Such could be done but it is not believed necessary for commercial tracking purposes. By not providing such information, a greater degree of privacy is provided to the rental customer.

It is to be understood that with minor modifications, the TTRD of FIG. 1 is suitable for use with a video cassette tape. In this case, the laser system 18 is replaced with a VCR (magnetic) read head. Further details of the video cassette embodiment are provided below.

While FIG. 1 is a block diagram, each of the blocks represents a conventional commercially available element and moreover, the interconnections between the blocks are well within the skill of one of ordinary skill in the art.

Figure 2:
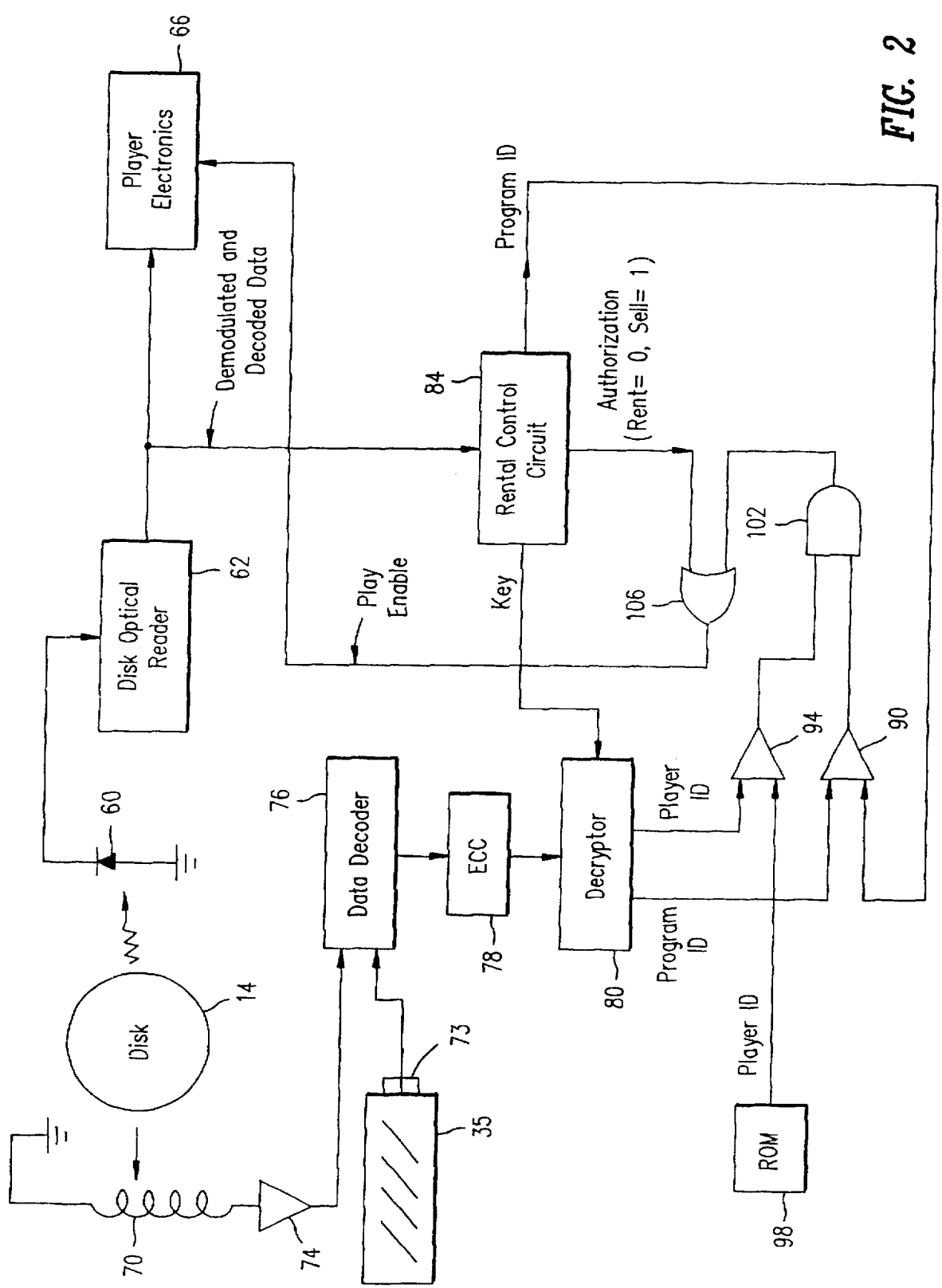
FIG. 2 shows a player in accordance with the present invention.

The rental customer then takes the rental disc 14 and card 35 to his home and inserts both in his player which is shown in block form in FIG. 2.

The player of FIG. 2 includes several major elements common to all video disc players. These include a drive (not shown for simplicity) for the disc 14, an optical read device which in this diagram is a laser system 60 (similar to element 18 of FIG. 1), and a disc optical reader 62 similar to optical reader 12 which drives conventional player electronics 66. Thus elements 62 and 66 are conventional and of the type that would be provided in any video disc player, even one not in accordance with the present invention. The data stream from laser system 60 is provided to the disc optical reader 62 which then provides demodulated and decoded data to the conventional player electronics 66, which is typically connected to a television set or monitor for viewing.

The other elements shown in FIG. 2 are added in accordance with the present invention to achieve the desired security. In the authorization card embodiment, these include a slot connector 73 which connects to authorization card 35.

In the alternative embodiment, also shown in FIG. 2 for simplicity, these additional elements include a magnetic read head 70 having a structure similar to that of write head 42 in FIG. 1 and being adapted for reading the magnetic track on disc 14. The signals from magnetic read head 70 are provided to a conventional analog amplifier 74. The performance of the magnetic read head 70 in the player need not be high; since the total amount of information recorded is approximately 100 bytes, the signal frequency is on the order of 10 KHz and hence a low cost and simple magnetic read head and amplifier would be adequate. It is to be understood that typically both embodiments would not be present in any one player.

The signals from amplifier 74 (or connector 73) are provided to a conventional data decoder 76 which is the complement of data coder 34 in FIG. 1. The information recorded on the magnetic track on the disc in the alternative embodiment typically would be recorded using some form of modulation for the purpose of matching the recorded signal to the capabilities of the media. This modulation is typically called channel coding. Various methods of channel coding are well known. Thus in the player the magnetic reading circuitry includes data decoder 76 to decode (demodulate) this data in the alternative embodiment. A typical method of coding suitable in accordance with the present invention would be frequency shift keying. Another suitable method is quadrature phased shift keying. Decoder 76 thus provides a conventional digital signal from the analog read signal from the head and amplifier. In the authorization card embodiment, decoder 76 would be a simpler digital circuit or may even be dispensed with.

The decoded data (in digital form) is provided to conventional error correction circuitry 78 to find and correct any errors in the data. The corrected data is then provided to a decryptor 80 which is the complementary device to encryptor 26 of FIG. 1. It is to be understood, however, that in the public key/private key system described above, the encryptor and decryptor are not simple complements of each other, in order to provide heightened security. The structure of decryptor 80 is that of the type commercially available from, for instance, RSA Data for their public key system.

The demodulated and decoded data (but not encrypted) from the disc optical reader 62 is provided to a rental control circuit 84. The function of circuit 84 is to pick out the relevant data. This is relatively simple since the relevant data are known to be in particular locations of the initialization region of disc 14. The rental control circuit 84 selects three data items from the stream of demodulated and decoded data. The first item data is the program identification ("program ID"). The second is the decryption key (including the modulus). The third is the indication of authorization which provides an indication of the disc being a rental or sell disc. In this embodiment, the authorization indication is a single bit; if the value of the bit is 0, this is a rental disc. If the value is 1, this is a disc for sale. The authorization bit need not be encrypted. The key (including the modulus) (this is preferably the public key) is provided to decryptor 80 for purposes of decryption. The program identification is provided to a first comparator 90 as a first input thereof. The second input to comparator 90 is the decrypted program identification provided by decryptor 80 from the data read from the authorization medium.

A second comparator 94 has as a first input the player identification from a read only memory (ROM) 98 included in the player, providing a player identification number which may be for instance a number as small as two decimal digits but preferably would be somewhat higher. The second input to comparator 94 is the decrypted player identification from decryptor 80 from data on the authorization medium. The comparison function for comparing the program identification and player identification may be for instance logic circuit comparators comparing two sets of parallel bits. Alternatively, the comparison (and other functions described herein) may be carried out by equivalents such as a control program executed by the microprocessor typically present in disc players. In this case the microprocessor control program would take the two serial streams and perform a conventional bit-by-bit comparison.

Each of comparators 90 and 94 provides, for instance, a high output if the comparison is a match i.e., the input data on the two inputs are identical. Similarly, each comparator 90 and 94 provides a low output signal if the inputs fail to match.

The output signals of comparators 90 and 94 are then provided to an AND gate 102. Thus only if the output signals from both comparator 90 and comparator 94 are high does AND gate 102 provide a high output signal. The output signal from AND gate 102 is the first input to an OR gate 106. The second input to OR gate 106 is the authorization bit. Thus if this is a disc for sale, OR gate 106 receives a high input from the authorization bit. If the disc 14 is a rental disc, the authorization bit is 0 and the output of OR gate 106 is controlled by the output of AND gate 102. OR gate 106 then provides a play enable signal to, for instance, player electronics 66 (or to any other operating portion of the player) to enable operation thereof. Thus only if the output signal from OR gate 106 is high will the player be enabled for operation, i.e. playing of the program portion of the disc 14. This enablement function can take any one of a number of forms in terms of which portions of the player are enabled.

Thus it is to be understood that for a rental disc, only if the program identification recorded on the authorization medium of the disc matches the program identification on the optical portion of the disc, and additionally only if the player identification of the player matches the player identification recorded on the authorization medium, is the player operative for playing the disc. Thus the play enable signal, which is the output signal from OR gate 106, is needed to enable reading of any portions of the disc other than the initialization region.

Digital video disc players are sophisticated devices providing high speed digital signal processing i.e., have substantial embedded computing power. Thus it would be relatively inexpensive to include a small amount of additional program code to execute in software the functions illustrated in FIG. 2 in the form of logic circuitry. Thus is to be understood that while FIG. 2 shows a logic circuitry (hardware) embodiment, conversion of these functions to such a computer program is relatively simple and well within the skill of one of ordinary skill in the art in the light of this disclosure.

Figure 3:
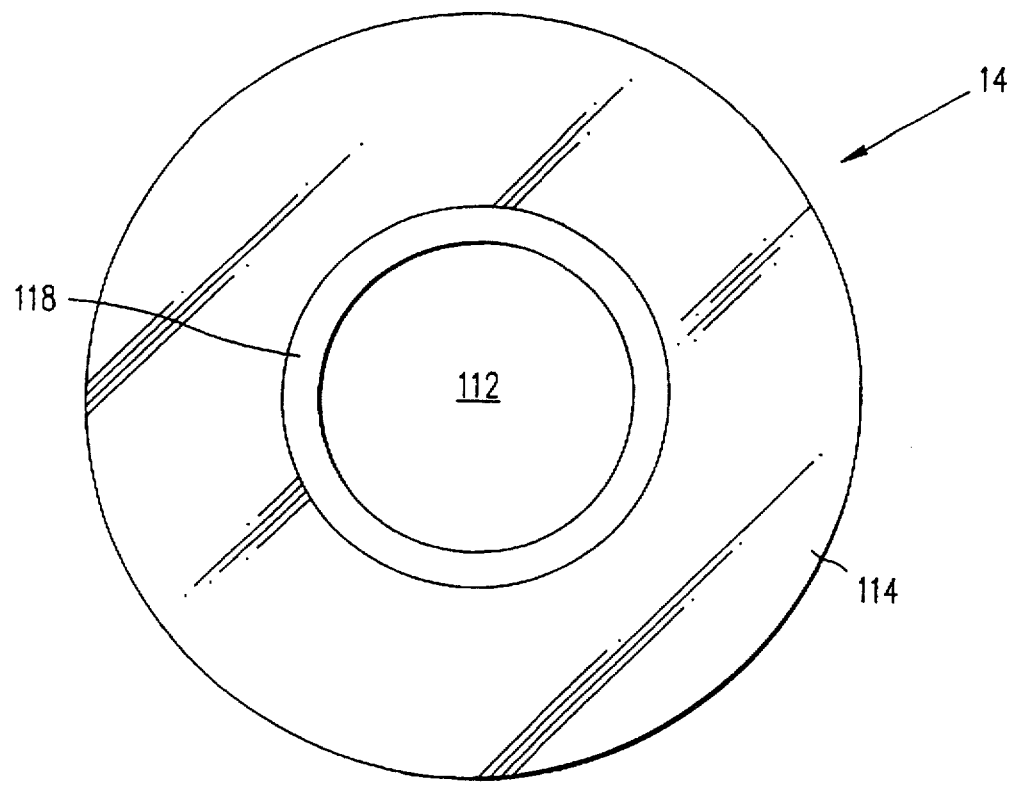
FIG. 3 shows a video disc in accordance with an alternative embodiment of the present invention.

FIG. 3 shows a top view of a video disc 14 in accordance with the alternative embodiment of the invention. The video disc 14 includes a central hub region 112 which is used conventionally for mechanically holding the disc when being played. The optically recorded portion of the disc is the entire outer region 114 which contains optical tracks (not shown for clarity). The added element to such a disc in accordance with the present invention is the narrow magnetic track 118 which in this case immediately surrounds the hub region. Track 118 has a magnetic coating similar to that for instance of magnetic tape or a floppy disc, for conventional magnetic recording and reading. Magnetic track 118 accommodates only approximately 100 bytes of data and hence may be recorded at low density.

While the media referred to herein are digital video discs and video tapes, it is to be understood that this is not limiting. Other types of media are suitable such as a magneto-optical disc. The chief requirement is that the medium used in accordance with the invention have at least a small area suitable for recording (and subsequent rerecording) thereon by the TTRD.

Figure 4:
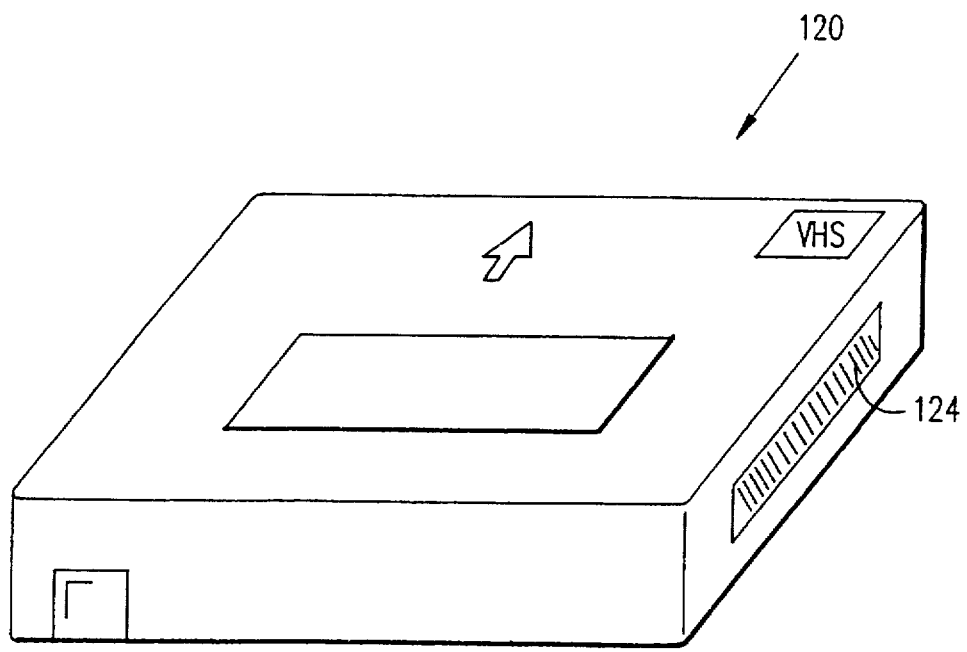
FIG. 4 shows a video cassette tape in accordance with the alternative embodiment of the present invention.

FIG. 4 shows a VHS video tape cassette in accordance with a second version of the alternative embodiment of the present invention. This video cassette is conventional in all respects except that located on an exterior of the housing is a magnetic track 124. In this case, magnetic track 124 is shown on a side surface. However, it may also be on the other side surface or on the top or bottom surfaces. In any case, the magnetic track is on a surface which, when the cassette is inserted into a VCR, moves past a magnetic read head located inside the VCR for purposes of reading the data recorded on the track 124. A similar magnetic head mechanism is used for writing the track 124 in the TTRD. Track 124 may be relatively short and record at a relatively low data density since it again only involves approximately 100 bytes of data.

In this video cassette version, the information which in the video disc version is recorded on the optical portion of the disc is instead recorded on the video tape itself. This would be recorded e.g. on each frame or perhaps alternate frame in a convenient location so that the player can easily find this information without having to hunt for any particular location on the tape.

Also in the videotape cassette version there is a problem that the program content is of course readily altered by proper equipment. Thus it would be possible for a hacker to alter the rental control bit, i.e. alter a rental control bit from indicating rental to indicating this particular video cassette is intended for sale (not for rent). This is undesirable since it defeats the entire rental security system. To prevent this, the rental control bit, instead of standing alone, is the first bit in a block of data all of which is encrypted using a private key and decryptable by use of a public key stored in the particular VCR player. The rest of the data in the block is important picture or other data. This would prevent such alteration of the rental control bit.

Another version of the present system for video cassette tapes does not require provision of a magnetic recording area on the cassette housing or sprocket ends. Instead, a predetermined portion of the video tape is used for recording the encrypted program identification and player identification. This is less desirable since it would require rewinding of the tape by the TTRD to find this particular predetermined area of the tape.

In the event that this rental control system is adopted by the DVD standards setting bodies, an issue arises with respect to universal manufacturer compliance. Since there is some added cost to each DVD player to implement this system, there is an incentive for any one particular manufacturer not to add the necessary circuitry and interface in order to gain a pricing advantage. The system as described herein does not require any special subsystem in a DVD player to allow rental discs (or tapes to play thereon.

If universal compliance cannot for some reason be obtained through contractual arrangements between all manufacturers, a technical method in accordance with the invention will assure compliance by each manufacturer. One method, compatible with the system described herein, is to encrypt a small but important segment of the programmed data on each disc with a special movie-dependent encryption key into a range for the matching decryption key to be delivered to the player from the TTRD, via the authorization card. Any encryption decryption system may be used herein. Therefore in order to be able to play rental discs, non-compliant DVD players would need to contain all of the subsystems as described herein needed by complying players and thus the owners of non-complying players would also have to have disc rental transactions processed by legitimate TTRDs. This should remove any incentives for manufacturers not to comply.

In another version of the system with reduced security but enhanced "user friendliness," there is no player identification provided. That is, all players are identical (generic) so far as security is concerned. Instead each player includes an electronic clock or equivalent which tracks the time and date, for instance to the nearest hour, over the life of the product. Thus when the renter rents a disc, the TTRD at the rental store writes on the authorization card the movie identification and a rental date window, for instance 48 hours or 72 hours from the time of the rental.

Then when the renter takes the disc and the authorization card home and puts both into his player to play the disc, the control circuitry in the player compares the movie identification from the disc to that on the authorization card, and also compares the date window on the authorization card to the current date and time according to its internal clock. The disc will only then be played if the date matches the current data and time, and the player identification matches.

It is to be understood that the security in this version is less than that in the above described embodiments, since a hacker would be able to deduce the date window in the encrypted form and provide such a date window together with the movie identification in encrypted form without use of the authorized (legitimate) TTRD and write both of these pieces of information on the authorization card. However such hacker-type authorization would only be good for the particular date window which the hacker had obtained in encrypted form. i.e. a specific 48 or 72 hours.

This disclosure is illustrative and not limiting; further modifications will be apparent to one skilled in the art in the light of the present disclosure and are intended to fall within the scope of the appended claims.

What is claimed:

1. A video disc, comprising:
    an optically recorded content portion including prerecorded video material and an initialization region, the initialization region including a data decryption key, a program identification identifying the prerecorded video material, and a play authorization indication; and a magnetic track, the magnetic track being at a predetermined location on the disc relative to the optically recorded content portion, the magnetic track including a recording of an encryption of both the program identification and a particular player number.

2. A previously authenticated prerecorded video disc, comprising:

an optically recorded content portion including a prerecorded video material region and an initialization region, the initialization region including a data decryption key, a program identification identifying the prerecorded video material, and a play authorization indication; and a magnetic track region, the magnetic track being at a predetermined location on the disc relative to the optically recorded content portion, the magnetic track including a recording of an encryption of both the program identification and a particular player number.

* * * * *